US010227087B2

(12) United States Patent
Fujino et al.

(10) Patent No.: US 10,227,087 B2
(45) Date of Patent: Mar. 12, 2019

(54) STEERING CONTROL DEVICE AND STEERING CONTROL METHOD (71) Applicant: DENSO CORPORATION, Kariya, Aichi-pref. (JP)

(72) Inventors: Rui Fujino, Kariya (JP); Hirotaka Tokoro, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/575,751

(22) PCT Filed: May 20, 2016

(86) PCT No.: PCT/JP2016/065066
§ 371 (c)(1),
(2) Date: Nov. 20, 2017

(87) PCT Pub. No.: WO2016/190253
PCT Pub. Date: Dec. 1, 2016

(65) Prior Publication Data
US 2018/0118257 A1 May 3, 2018

(30) Foreign Application Priority Data
May 22, 2015 (JP) .................. 2015-104515

(51) Int. Cl.
B62D 6/00 (2006.01)
B60W 50/08 (2012.01)
B60N 2/00 (2006.01)
B62D 6/02 (2006.01)
B62D 1/28 (2006.01)
B62D 5/04 (2006.01)
B62D 15/02 (2006.01)

(52) U.S. Cl.
CPC ............. *B62D 6/001* (2013.01); *B60N 2/002* (2013.01); *B60W 50/08* (2013.01); *B62D 1/286* (2013.01); *B62D 5/0466* (2013.01); *B62D 6/007* (2013.01); *B62D 6/02* (2013.01); *B62D 15/0285* (2013.01)

(58) Field of Classification Search
CPC ....... B62D 6/001; B62D 1/286; B60W 50/08; B60N 2/002
USPC .................................................... 701/23, 41
See application file for complete search history.

(56) References Cited

U.S. PATENT DOCUMENTS

2007/0144823 A1    6/2007  Senda et al.
2016/0144858 A1    5/2016  Burtsche et al.

FOREIGN PATENT DOCUMENTS

JP    2004352001 A    * 12/2004
JP    2006-347460 A      12/2006
KR    20130091105 A    *  8/2013

* cited by examiner

Primary Examiner — Isaac G Smith
(74) Attorney, Agent, or Firm — Knobbe, Martens, Olson & Bear, LLP (57) ABSTRACT A steering control device that can set and cancel an automatic driving mode includes a steering control unit, a cancellation instruction detection unit, a stop detection unit, and a steering angle reduction unit. The steering control unit controls a steering angle in the automatic driving mode so that a vehicle travels along an intended route. The cancellation instruction detection unit detects a cancellation instruction to cancel the automatic driving mode. The stop detection unit detects a stop of the vehicle. The steering angle reduction unit reduces the steering angle set by the steering control unit, if the cancellation instruction detection unit detects the cancellation instruction and the stop detection unit detects the stop of the vehicle.

8 Claims, 5 Drawing Sheets

STEERING CONTROL DEVICE AND STEERING CONTROL METHOD

CROSS-REFERENCE TO RELATED APPLICATION

This application is based on and claims the benefit of priority from earlier Japanese Patent Application No. 2015-104515 filed on May 22, 2015, the description of which is incorporated herein by reference.

TECHNICAL FIELD

The present disclosure relates to a technique for controlling steering.

BACKGROUND ART

A steering control device having an automatic driving function has been known. The conventional steering control device sets a steering angle so that a vehicle travels along an intended route (see Patent Literature 1).

CITATION LIST

Patent Literature

[PTL 1] JP 2006-347460 A

SUMMARY OF THE INVENTION

Technical Problem

In the state where automatic driving is performed (hereinafter, referred to as "automatic driving mode"), a steering angle is automatically set. When such an automatic driving mode is cancelled and shifted to a state where the vehicle is manually driven (hereinafter, referred to as "manual driving mode"), the steering angle is not necessarily zero degrees. In this case, if the driver starts to manually drive the vehicle without noticing that the steering angle is not zero degrees, there is a possibility that the vehicle travels in a direction different from the direction that the driver desires.

An object of the present disclosure is to provide a steering control device for improving safety of a vehicle and a steering control method performed by the steering control device.

Solution to Problem

A steering control device of the present disclosure can set and cancel an automatic driving mode. The steering control device includes a steering control unit, a cancellation instruction detection unit, a stop detection unit, and a steering angle reduction unit. The steering control unit controls a steering angle in the automatic driving mode so that a vehicle travels along an intended route. The cancellation instruction detection unit detects a cancellation instruction to cancel the automatic driving mode. The stop detection unit detects a stop of the vehicle. The steering angle reduction unit reduces the steering angle set by the steering control unit, if the cancellation instruction detection unit detects the cancellation instruction and the stop detection unit detects the stop of the vehicle.

According to the steering control device of the present disclosure, when the instruction to cancel the automatic driving mode is detected and the stop of the vehicle is detected, the steering angle set by the steering control unit in the automatic driving mode is reduced. This allows the steering control device of the present disclosure to reduce a possibility that when the automatic driving mode is cancelled and switched to the manual driving mode, and the stopped vehicle starts to move, the vehicle travels in a direction that the driver does not desire. Consequently, the steering control device of the present disclosure improves safety of the vehicle.

DESCRIPTION OF THE EMBODIMENTS

The following description will discuss an embodiment of the present disclosure with reference to drawings.

First Embodiment

1. Configuration of Steering Control Device

Figure 1:
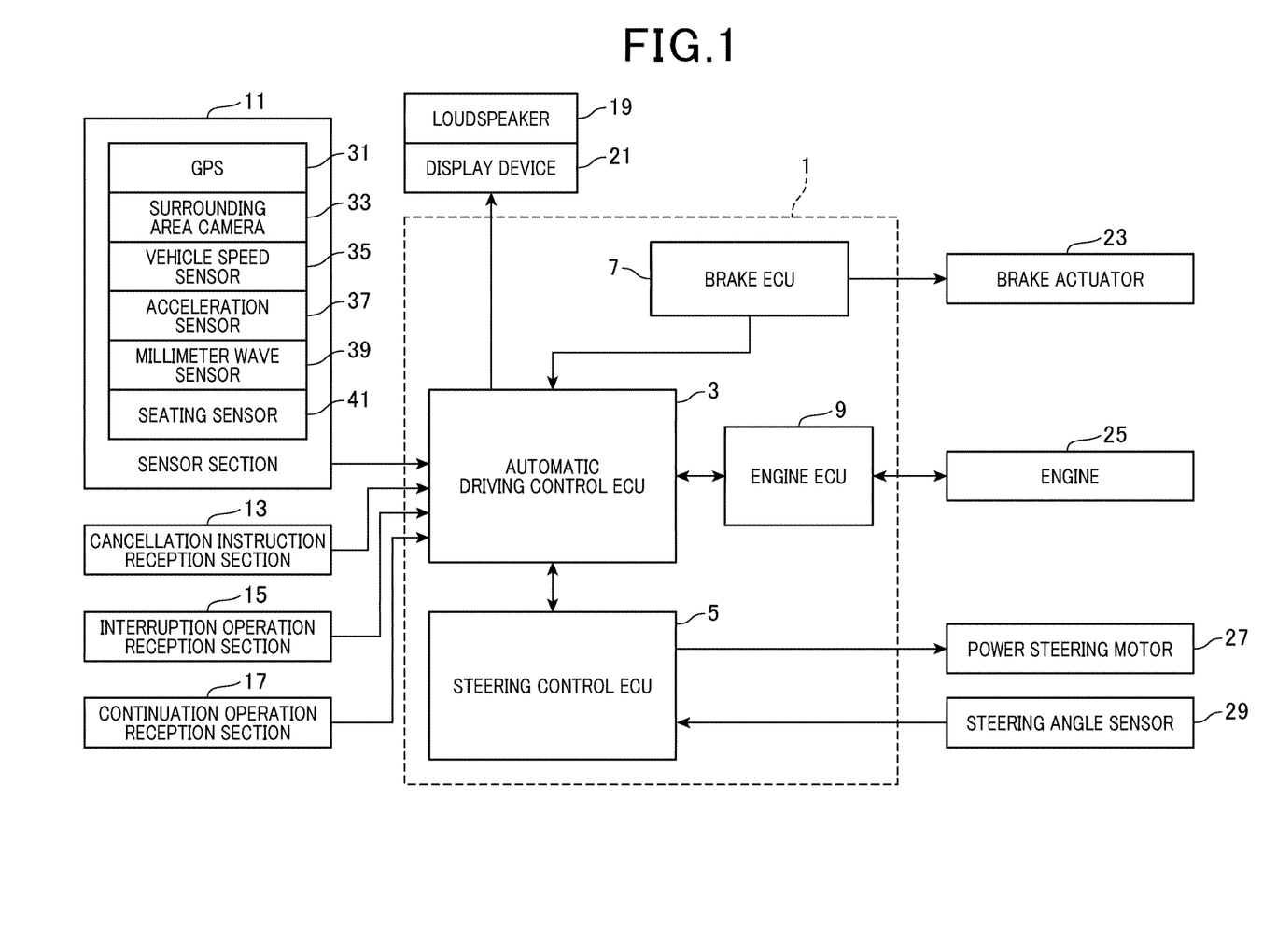
FIG. 1 is a block diagram showing a configuration of a steering control device.

FIG. 1 is a block diagram showing a configuration of a steering control device 1 of the present embodiment. With reference to FIG. 1, the following description will discuss the configuration of the steering control device 1 of the present embodiment. The steering control device 1 of the present embodiment is a vehicle-mounted device which is provided in a vehicle. The vehicle which is provided with the steering control device 1 is hereinafter referred to as own vehicle. The steering control device 1 includes an automatic driving control ECU 3, a steering control ECU 5, a brake ECU 7, and an engine ECU 9. The automatic driving control ECU 3 is an arithmetic unit for controlling automatic driving of the vehicle. The steering control ECU 5 is an arithmetic unit for controlling steering of the vehicle. The brake ECU 7 is an arithmetic unit for controlling a brake. The engine ECU 9 is an arithmetic unit for controlling an engine. The ECUs 3, 5, 7, and 9 are each a microcomputer including a CPU, a memory (e.g., RAM, ROM, etc.), I/O, and the like. According to the ECUs 3, 5, 7, and 9, the CPU executes, for example, a program stored in the ROM, so that a function (process described later) provided by the steering control device 1 is achieved.

The automatic driving control ECU 3 achieves a cancellation instruction detection function, a stop detection function, an occupant determination function, an interruption operation detection function, a continuation operation detection function, a travel direction notification function, and a state notification function. That is, the automatic driving control ECU 3 is an example of a cancellation instruction detection unit, a stop detection unit, an occupant determination unit, an interruption operation detection unit, a continuation operation detection unit, a travel direction notification unit, and a state notification unit. The cancellation instruction detection unit detects a cancellation instruction to cancel an automatic driving mode. The stop detection unit detects a stop of the vehicle. The occupant determination unit determines whether an occupant (e.g., driver and the like) is present in the vehicle. The interruption operation detection unit detects a predetermined interruption operation when the interruption operation is performed by the occupant in the vehicle. The continuation operation detection unit detects a predetermined continuation operation when the continuation operation is performed by the occupant in the vehicle. The travel direction notification unit notifies a direction of travel of the vehicle based on a current steering angle. The state notification unit notifies start and end of a process (state of a process) regarding the steering angle. The steering control ECU 5 achieves a steering control function and a steering angle reduction function. That is, the steering control ECU 5 is an example of a steering control unit and a steering angle reduction unit. The steering control unit controls the steering angle in the automatic driving mode so that the vehicle travels along a predetermined intended route. The steering angle reduction unit reduces the steering angle, which has been set by the steering control unit, based on a predetermined condition.

In addition to the steering control device 1, the own vehicle includes a sensor section 11, a cancellation instruction reception section 13, an interruption operation reception section 15, a continuation operation reception section 17, a speaker 19, and a display device 21. The own vehicle further includes a brake actuator 23, an engine 25, a power steering motor 27, and a steering angle sensor 29.

The sensor section 11 includes a GPS 31, a surrounding area camera 33, a vehicle speed sensor 35, an acceleration sensor 37, a millimeter wave sensor 39, and a seating sensor 41. The GPS 31 acquires information on a position of the own vehicle by using a radio wave transmitted by a navigation satellite. The surrounding area camera 33 photographs an area around the own vehicle and generates image data. The vehicle speed sensor 35 detects a vehicle speed of the own vehicle. The acceleration sensor 37 detects acceleration of the own vehicle. The millimeter wave sensor 39 examines a predetermined region by using a radio wave in a millimeter wave region and detects a target (e.g., another vehicle, pedestrian, fixed object, or the like) which is present around the own vehicle. The seating sensor 41 detects an occupant (driver) who is seated on a seat of the own vehicle.

The cancellation instruction reception section 13 receives a cancellation instruction to cancel the automatic driving mode. Examples of the cancellation instruction include a specific switch operation input and button operation input which are performed by the occupant and a specific voice input which is pronounced by the occupant. When the cancellation instruction is the switch operation input or button operation input, the cancellation instruction reception section 13 is the switch or the button. When the cancellation instruction is the specific voice input, the cancellation instruction reception section 13 is a microphone, an electrical signal conversion unit, and a voice recognition unit. The electrical signal conversion unit converts a voice detected by the microphone into an electrical signal. The voice recognition unit recognizes a specific voice in the converted electrical signal. When the cancellation instruction reception section 13 receives a cancellation instruction, the automatic driving control ECU 3 functions as the cancellation instruction detection unit and detects the cancellation instruction thus received.

The interruption operation reception section 15 receives a predetermined interruption operation which is performed by the occupant. Examples of the interruption operation include an operation in which, during a process (described later) for reducing a steering angle, a torque in an opposite direction to a direction of rotation of steering which is turning is applied to the steering. In this case, the interruption operation reception section 15 is a sensor which detects the steering torque in the opposite direction. The interruption operation may be a specific switch operation or button operation. In this case, the interruption operation reception section 15 is the switch or the button. When the interruption operation reception section 15 receives an interruption operation, the automatic driving control ECU 3 functions as the interruption operation detection unit and detects the interruption operation thus received.

The continuation operation reception section 17 receives a predetermined continuation operation which is performed by the occupant. Examples of the continuation operation include an operation of again applying a torque to the steering whose rotation has been interrupted once, in a direction of rotation of the steering before the interruption, during the process (described later) for reducing the steering angle. In this case, the continuation operation reception section 17 is a sensor which detects the steering torque in the direction of rotation of the steering before the interruption. The continuation operation can be a specific switch operation or button operation. In this case, the continuation operation reception section 17 is the switch or the button. When the continuation operation reception section 17 receives a continuation operation, the automatic driving control ECU 3 functions as the continuation operation detection unit and detects the continuation operation thus received.

The speaker 19 is provided in a cabin of the own vehicle and outputs a voice. The display device 21 is a display which is provided in the cabin of the own vehicle and displays an image. The brake actuator 23 performs a braking action (braking control) of the own vehicle. The engine 25 generates a driving force of the own vehicle. The power steering motor 27 performs a steering action (steering control) of the own vehicle. In the automatic driving mode, the power steering motor 27 performs steering in accordance with the steering angle set by the steering control device 1. In a manual driving mode, the power steering motor 27 assists a steering action performed by the occupant. The steering angle sensor 29 detects a steering angle of the own vehicle.

2. Automatic Driving Mode

According to the steering control device 1 of the present embodiment, the automatic driving mode can be set and cancelled. When the automatic driving mode is set, the steering control device 1 performs automatic driving. An outline of the automatic driving is as described below. In the automatic driving mode, the steering control device 1 acquires an intended route to a predetermined destination. For example, in accordance with designation of a destination made by the occupant, the steering control device 1 can acquire the intended route to the destination, based on map information or from an external server or the like.

In the automatic driving mode, the steering control device 1 periodically acquires information on the position of the own vehicle using the GPS 31. Thus, while comparing the acquired information on the position of the own vehicle with the intended route, the steering control device 1 controls the power steering motor 27 (controls the steering angle) so that the own vehicle travels along the intended route. The above control process performed by the steering control device 1 is mainly achieved by cooperation of the automatic driving control ECU 3 and the steering control ECU 5.

In the automatic driving mode, the steering control device 1 controls the engine 25 and the brake actuator 23 so that a vehicle speed of the own vehicle becomes an intended vehicle speed which is suitable for each position on the intended route. The above control process performed by the steering control device 1 is mainly achieved by cooperation of the automatic driving control ECU 3, the brake ECU 7, and the engine ECU 9. For example, the intended vehicle speed can be set in advance for each position on the intended route. Alternatively, the intended vehicle speed can be set by the steering control device 1 as appropriate based on a curvature or the like of a road ahead such as a curved road. Thus, the steering control device 1 of the present embodiment achieves the automatic driving as described above by the control performed by each of the ECUs 3, 5, 7, and 9.

The automatic driving mode is set when the occupant provides a predetermined setting instruction to the steering control device 1. The set automatic driving mode is cancelled when the occupant provides a cancellation instruction to the cancellation instruction reception section 13. After the automatic driving mode is cancelled, the occupant can manually drive the own vehicle.

3. Process Performed by Steering Control Device 1

Figure 2:
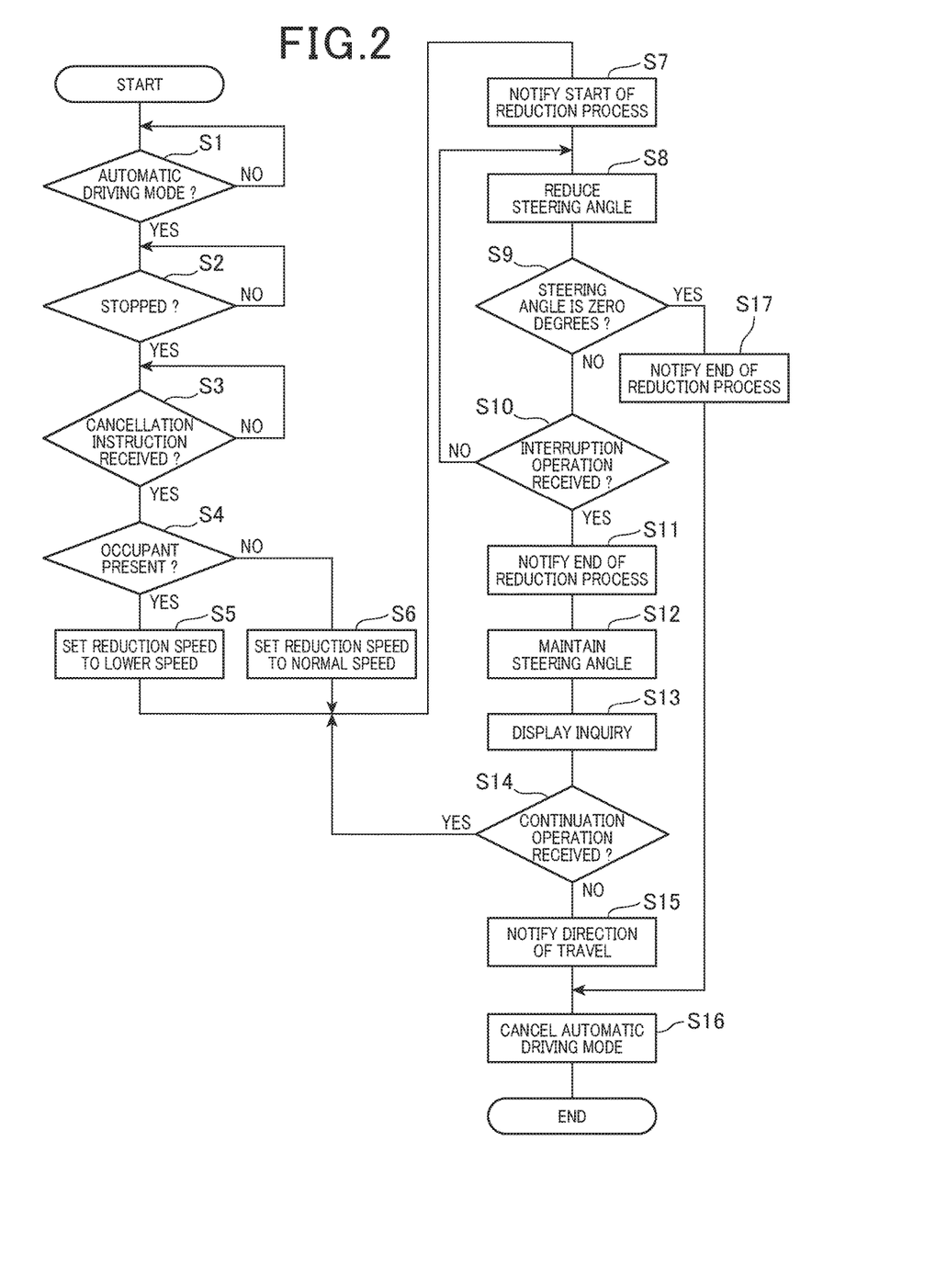
FIG. 2 is a flowchart showing a process performed by the steering control device.

FIG. 2 is a flowchart showing a process which is performed by the steering control device 1 of the present embodiment. With reference to FIG. 2, the following description will discuss the process which is performed by the steering control device 1 of the present embodiment for each predetermined cycle. According to the steering control device 1, this process is performed by the automatic driving control ECU 3 and the steering control ECU 5 in cooperation. First, according to the control device 1, the automatic driving control ECU 3 determines whether the automatic driving mode is set (S1). Then, according to the steering control device 1, when the automatic driving control ECU 3 determines that the automatic driving mode is set (YES at S1), control proceeds to step S2. Meanwhile, according to the steering control device 1, when the automatic driving control ECU 3 determines that the automatic driving mode is not set (NO at S1), the automatic driving control ECU 3 repeats the determination process at step S1.

Subsequently, according to the steering control device 1, based on a value detected by the vehicle speed sensor 35, the automatic driving control ECU 3 determines whether the own vehicle is stopped (vehicle speed is 0 km/h) (S2). As a result, according to the steering control device 1, when the automatic driving control ECU 3 determines that the own vehicle is stopped (YES at S2), control proceeds to step S3. Meanwhile, according to the steering control device 1, when the automatic driving control ECU 3 determines that the own vehicle is not stopped (NO at S2), the automatic driving control ECU 3 repeats the determination process at step S2. Thus, the automatic driving control ECU 3 functions as the stop detection unit.

Subsequently, according to the steering control device 1, the automatic driving control ECU 3 determines whether the cancellation instruction reception section 13 has received a cancellation instruction to cancel the automatic driving mode (S3). As a result, according to the steering control device 1, when the automatic driving control ECU 3 determines that the cancellation instruction reception section 13 has received the cancellation instruction to cancel the automatic driving mode (YES at S3), control proceeds to step S4. Meanwhile, according to the steering control device 1, when the automatic driving control ECU 3 determines that the cancellation instruction reception section 13 has not received the cancellation instruction to cancel the automatic driving mode (NO at S3), the automatic driving control ECU 3 repeats the determination process at step S3. Thus, the automatic driving control ECU 3 functions as the cancellation instruction detection unit.

Subsequently, according to the steering control device 1, based on a result of detection performed by the seating sensor 41, the automatic driving control ECU 3 determines whether an occupant is present in the own vehicle (S4). As a result, according to the steering control device 1, when the automatic driving control ECU 3 determines that the occupant is present in the own vehicle (YES at S4), control proceeds to step S5. Meanwhile, according to the steering control device 1, when the automatic driving control ECU 3 determines that no occupant is present in the own vehicle (NO at S4), control proceeds to step S6. Thus, the automatic driving control ECU 3 functions as the occupant determination unit.

According to the steering control device 1, the automatic driving control ECU 3 functions as the steering angle reduction unit and sets, to a lower speed (slower speed), a reduction speed at which the steering angle is reduced in a process at step S8 (described later) (S5). That is, the automatic driving control ECU 3 sets an amount of reduction in steering angle per unit time to be smaller than when the reduction speed is normal. Meanwhile, according to the steering control device 1, the automatic driving control ECU 3 sets, to a normal speed, the reduction speed at which the steering angle is reduced in the process at step S8 (described later) (S6). In other words, the automatic driving control ECU 3 sets, as the normal speed, a speed faster than the speed set in the process at step S5. That is, the automatic driving control ECU 3 sets the amount of reduction in steering angle per unit time to be larger than when the reduction speed is lower.

Subsequently, according to the steering control device 1, the automatic driving control ECU 3 notifies start of the process for reducing the steering angle (S7). A state of the process regarding the steering angle is notified by outputting a voice using the speaker 19, displaying an image using the display device 21, and the like. Thus, the automatic driving control ECU 3 functions as the state notification unit.

Subsequently, according to the steering control device 1, the steering control ECU 5 reduces the steering angle in accordance with the reduction speed set in the process at step S5 or the process at step S6 (S8). That is, the steering control ECU 5 reduces the steering angle, based on the amount in reduction set by the automatic driving control ECU 3. For example, when the amount of reduction is one degree [1°], the steering angle is reduced by subtracting one degree from a current value of the steering angle detected by the steering angle sensor 29 and setting a result of the subtraction as a new steering angle. The steering control ECU 5 then performs a steering action in conjunction with the reduction in steering angle by controlling the power steering motor 27. Note that an expression "the steering angle is reduced" means that the steering angle is caused to be closer to zero degrees [0°] (steering angle when the own vehicle travels straight). Thus, the steering control ECU 5 functions as the steering angle reduction unit.

Subsequently, according to the steering control device 1, based on a value detected by the steering angle sensor 29, the steering control ECU 5 determines whether a current value of the steering angle is zero degrees (S9). Then, according to the steering control device 1, when the steering control ECU 5 determines that the current value of the steering angle is zero degrees (YES at S9), control proceeds to step S17. Meanwhile, according to the steering control device 1, when the steering control ECU 5 determines that the current value of the steering angle is not zero degrees (NO at S9), control proceeds to step S10.

According to the steering control device 1, the automatic driving control ECU 3 determines whether, after the last control cycle, the interruption operation reception section 15 has received an interruption operation for interrupting the process (S10). Then, according to the steering control device 1, when the automatic driving control ECU 3 determines that the interruption operation reception section 15 has received the interruption operation for interrupting the process (YES at S10), control proceeds to step S11. Meanwhile, according to the steering control device 1, when the automatic driving control ECU 3 determines that the interruption operation reception section 15 has not received the interruption operation for interrupting the process (NO at S10), the steering control ECU 5 repeats the processes at steps S8 and S9 (processes for reducing the steering angle). Thus, the automatic driving control ECU 3 functions as the interruption operation detection unit.

Subsequently, according to the steering control device 1, the automatic driving control ECU 3 notifies the end of the process for reducing the steering angle (S11). The end of the process is notified using members similar to those used at the start of this process.

Subsequently, according to the steering control device 1, the steering control ECU 5 maintains the steering angle at a current time point (S12). That is, the steering control ECU 5 maintains a rotational position of the steering according to the steering angle at the current time point. Thus, the steering control ECU 5 functions as the steering control unit. Subsequently, according to the steering control device 1, the automatic driving control ECU 3 inquires of the occupant whether the process for reducing the steering angle should be continued (necessity or not of continuation) (S13). The inquiry to the occupant regarding the necessity or otherwise of the continuation is made by outputting a voice using the speaker 19, displaying an image using the display device 21, and the like. For example, the automatic driving control ECU 3 causes the display device 21 to display an image showing an inquiry "Return steering angle to zero degrees?" and causes the speaker 19 to output a voice providing the inquiry.

Subsequently, according to the steering control device 1, the automatic driving control ECU 3 determines whether, within a predetermined time period after the process at step S13 has been performed, the continuation operation reception section 17 has received a continuation operation for continuing the process (S14). As a result, according to the steering control device 1, when the automatic driving control ECU 3 determines that the continuation operation reception section 17 has received the continuation operation for continuing the process (YES at S14), control proceeds to step S7 and the process for reducing the steering angle is continued. Meanwhile, according to the steering control device 1, when the automatic driving control ECU 3 determines that the continuation operation reception section 17 has not received the continuation operation for continuing the process (NO at S14), control proceeds to step S15. Thus, the automatic driving control ECU 3 functions as the continuation operation detection unit.

Subsequently, according to the steering control device 1, the automatic driving control ECU 3 notifies a direction of travel of the own vehicle based on the steering angle at a current time point (S15). The direction of travel is notified using members similar to those used when the inquiry to the occupant is made. For example, when the steering angle is 30 degrees in a rightward direction, the automatic driving control ECU 3 causes the display device 21 to display an image showing a message "This vehicle will move to the right." and causes the speaker 19 to output a voice providing the message. Thus, the automatic driving control ECU 3 functions as the travel direction notification unit.

Subsequently, according to the steering control device 1, the automatic driving control ECU 3 cancels the automatic driving mode based on a result of the determination at step S3 (S16). From this time point, the own vehicle is in the manual driving mode. According to the steering control device 1, when an affirmative determination is made in the determination process at step S9 (YES at S9), a process similar to the process at step S11 (notification of the end of the process for reducing the steering angle) is performed (S17). Then, according to the steering control device 1, the process at step S16 is performed.

4. Effects Yielded by Steering Control Device 1

(1A) According to the steering control device 1 of the present embodiment, the steering angle set by the steering control ECU 5 in the automatic driving mode is reduced on condition that a cancellation instruction to cancel the automatic driving mode is detected and a stop of the own vehicle is detected. That is, when the above condition is satisfied, the steering control device 1 performs the process for causing the steering angle to be closer to zero degrees (steering angle obtained when the own vehicle travels straight). Thus, according to the steering control device 1 of the present embodiment, the automatic driving mode is cancelled and switched to the manual driving mode and it becomes possible to reduce a possibility that when a stopped vehicle starts to move, the vehicle travels in a direction that the driver does not intend. Consequently, the steering control device 1 of the present embodiment improves safety of the own vehicle.

Figure 3A:
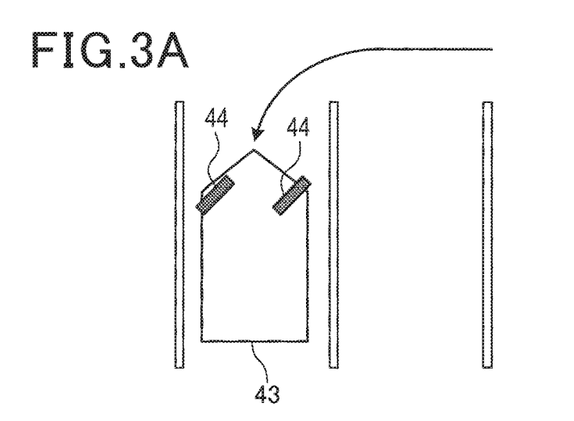
FIG. 3A is an explanatory diagram (part 1-1) showing an effect (improvement of vehicle safety) yielded by the steering control device.
Figure 3B:
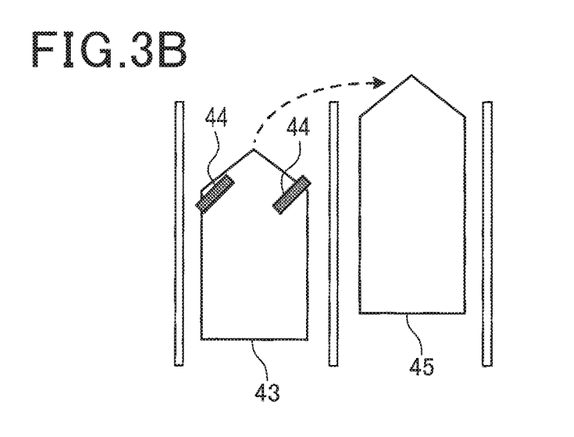
FIG. 3B is an explanatory diagram (part 1-2) showing the effect (improvement of vehicle safety) yielded by the steering control device.
Figure 3C:
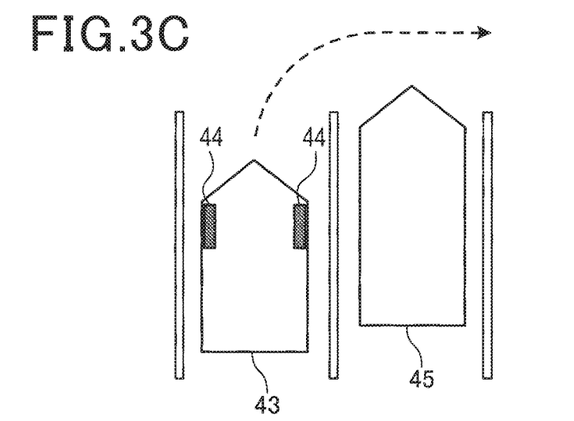
FIG. 3C is an explanatory diagram (part 1-3) showing the effect (improvement of vehicle safety) yielded by the steering control device.

FIGS. 3A to 3C are diagrams (parts 1-1 to 1-3) for explaining an effect yielded by the steering control device 1 of the present embodiment. With reference to an example shown in FIG. 3, the following description will discuss in detail the effect yielded by the steering control device 1. For example, assume that the own vehicle 43 is stopped in a predetermined parking space (position shown in FIG. 3A) in the automatic driving mode. Assume that the steering angle at this point is not zero degrees but a predetermined angle in a rightward direction, so that front wheels 44 are turned in the rightward direction. Subsequently, in the own vehicle 43, when the cancellation instruction reception section 13 receives a cancellation instruction to cancel the automatic driving mode, the steering control device 1 cancels the automatic driving mode. Assume that a large vehicle 45 is then stopped on the right side of the own vehicle 43 (position shown in FIG. 3B).

Under such a circumstance, if the driver starts to move the own vehicle 43 in the manual driving mode without noticing that the front wheels 44 of the own vehicle 43 are turned in the rightward direction, the own vehicle 43 travels diagonally right and forward (direction shown by a dashed line in FIG. 3B) even when the driver intends to travel straight. Under such a circumstance, there is thus a possibility that the own vehicle 43 comes into contact with the large vehicle 45.

Meanwhile, according to the steering control device 1, when a cancellation instruction to cancel the automatic driving mode is detected and a stop of the own vehicle 43 is detected, the process for reducing the steering angle is performed. Consequently, the steering angle of the stopped own vehicle 43 becomes zero degrees as shown in FIG. 3C. Accordingly, when the stopped own vehicle 43 starts to move in the manual driving mode, the own vehicle 43 travels straight. This makes it possible to prevent contact with a vehicle which is adjacent to the right side of the own vehicle 43 (contact with the large vehicle 45 that is stopped on the right side of the own vehicle 43) which contact is likely to occur when the front wheels 44 are turned in the rightward direction.

Figure 4:
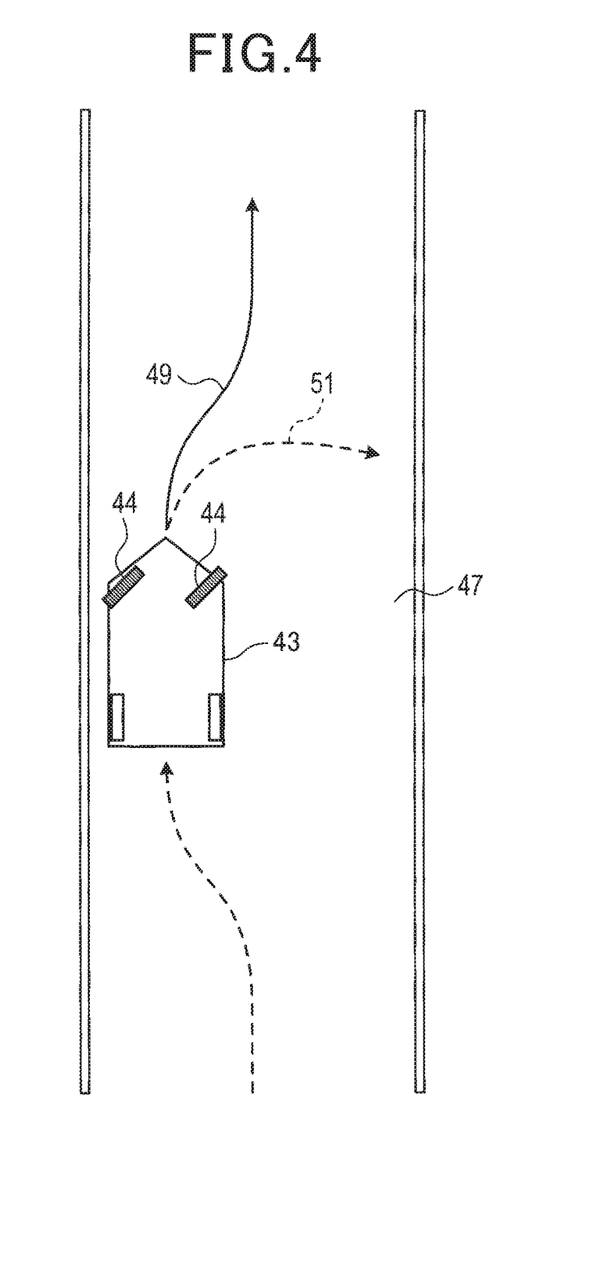
FIG. 4 is an explanatory diagram (part 2) showing an effect yielded by the steering control device.

FIG. 4 is a diagram (part 2) for explaining an effect yielded by the steering control device 1 of the present embodiment. With reference to an example shown in FIG. 4, the following description will discuss in detail the effect yielded by the steering control device 1. For example, assume that, as shown in FIG. 4, the own vehicle 43 is stopped on a left shoulder of a road 47 in the automatic driving mode. Assume that the steering angle at this point is not zero degrees but a predetermined angle in the rightward direction, so that the front wheels 44 are turned in the rightward direction. Subsequently, in the own vehicle 43, when the cancellation instruction reception section 13 receives a cancellation instruction to cancel the automatic driving mode, the steering control device 1 cancels the automatic driving mode.

Under such a circumstance, if the driver starts to move the own vehicle 43 in the manual driving mode without noticing that the front wheels 44 of the own vehicle 43 are turned in the rightward direction, the own vehicle 43 travels in a direction indicated by an arrow 51 (diagonally right and forward) even when the driver intends to travel straight. Under such a circumstance, there is thus a possibility that the own vehicle 43 comes into contact with another vehicle coming from behind.

Meanwhile, according to the steering control device 1, when a cancellation instruction to cancel the automatic driving mode is detected and a stop of the own vehicle 43 is detected, the process for reducing the steering angle is performed. Consequently, the steering angle of the stopped own vehicle 43 becomes zero degrees. Accordingly, when the stopped own vehicle 43 starts to move in the manual driving mode, the own vehicle 43 travels in a direction indicated by an arrow 49. This makes it possible to prevent contact with a rear vehicle (contact with a vehicle which is traveling on the right side behind the own vehicle 43) which contact is likely to occur when the front wheels 44 are turned in the rightward direction.

Figure 5:
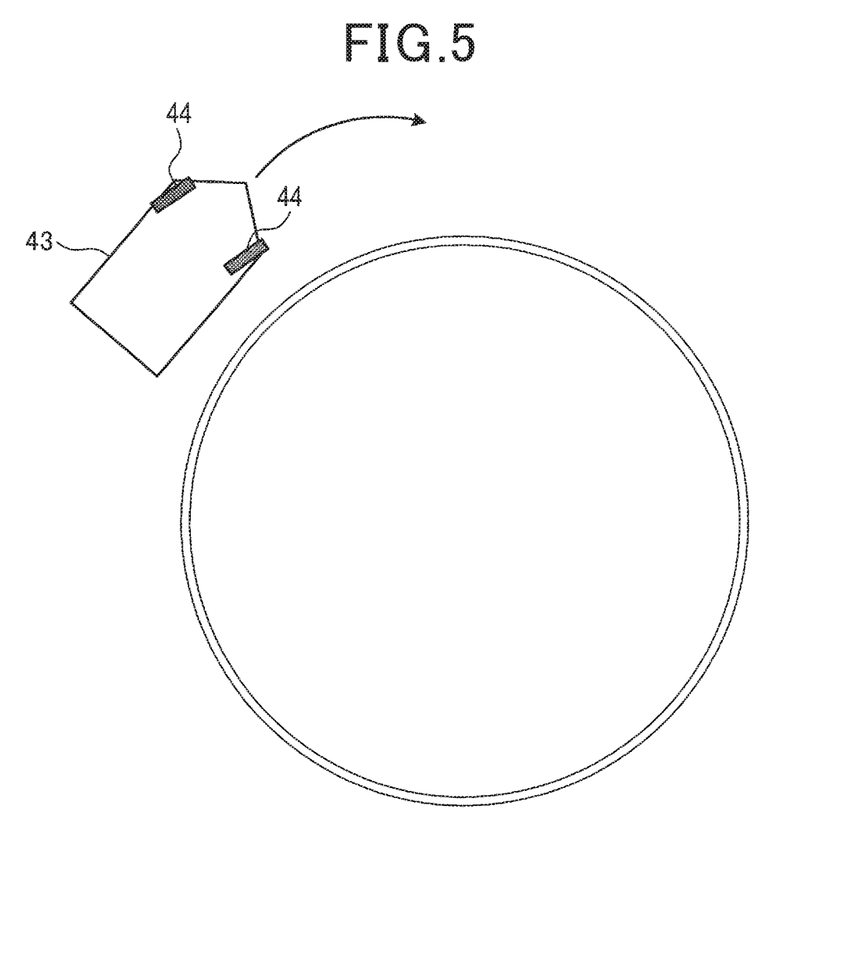
FIG. 5 is an explanatory diagram (part 3) showing an effect yielded by the steering control device.

FIG. 5 is a diagram (part 3) for explaining an effect yielded by the steering control device 1 of the present embodiment. With reference to an example shown in FIG. 5, the following description will discuss in detail the effect yielded by the steering control device 1. For example, assume that, as shown in FIG. 5, the own vehicle 43 enters a roundabout and is then stopped in the automatic driving mode. Assume that the steering angle at this point is not zero degrees but a predetermined angle in the rightward direction, so that the front wheels 44 are turned in the rightward direction. Subsequently, in the own vehicle 43, when the cancellation instruction reception section 13 receives a cancellation instruction to cancel the automatic driving mode, the steering control device 1 cancels the automatic driving mode.

Under such a circumstance, if the driver starts to move the own vehicle 43 in the manual driving mode without noticing that the front wheels 44 of the own vehicle 43 are turned in the rightward direction, the own vehicle 43 travels diagonally right and forward even when the driver intends to travel straight. Under such a circumstance, there is thus a possibility that the own vehicle 43 comes into contact with the roundabout.

Meanwhile, according to the steering control device 1, when a cancellation instruction to cancel the automatic driving mode is detected and a stop of the own vehicle 43 is detected, the process for reducing the steering angle is performed. Consequently, the steering angle of the stopped own vehicle 43 becomes zero degrees. Accordingly, when the stopped own vehicle 43 starts to move in the manual driving mode, the own vehicle 43 travels straight. This makes it possible to prevent contact with an object which is adjacent to the right side of the own vehicle 43 (contact with an object which is located on the right side of the own vehicle 43) which is likely to occur when the front wheels 44 are turned in the rightward direction.

(1B) According to the steering control device 1 of the present embodiment, it is determined whether an occupant is present in the own vehicle 43, and when it is determined that the occupant is present, the reduction speed of the steering angle is set to a lower speed than when no occupant is present (the amount of reduction in steering angle per unit time is set to be smaller than when the reduction speed is normal). Thus, the steering control device 1 of the present embodiment allows the occupant to feel less uncomfortable with an automatic steering action performed by the steering control (steering action which is not an action performed by an occupant operation). According to the steering control device 1 of the present embodiment, when no occupant is present, the reduction speed of the steering angle is set to a normal speed (the amount of reduction in steering angle per unit time is set to be larger than when the reduction speed is lower). This allows the steering control device 1 of the present embodiment to promptly cause the steering angle to be zero degrees.

(1C) According to the steering control device 1 of the present embodiment, when an interruption operation is received, the process for reducing the steering angle is interrupted even when the process is being performed. Accordingly, the occupant can interrupt at any timing the process for reducing the steering angle performed by the steering control device 1. This allows the steering control device 1 of the present embodiment to maintain in the automatic driving mode the steering angle which has been set at a time point when the occupant has performed the interruption operation.

(1D) According to the steering control device 1 of the present embodiment, when a continuation operation is received after the process for reducing the steering angle is interrupted, the process for reducing the steering angle is resumed and continued. Accordingly, for example, even when the occupant unintentionally interrupts the process by an erroneous operation or the like, the occupant can resume and continue the process for reducing the steering angle performed by the steering control device 1. This allows the steering control device 1 of the present embodiment to cause the steering angle to be zero degrees even in the above case.

(1E) According to the steering control device 1 of the present embodiment, when the process for reducing the steering angle is interrupted, the direction of travel of the own vehicle 43 is notified based on the steering angle at that time point. Thus, according to the steering control device 1 of the present embodiment, the occupant can easily understand the direction of travel of the stopped own vehicle 43 when the own vehicle 43 starts to move.

(1F) According to the steering control device 1 of the present embodiment, start and end of the process regarding the steering angle including the process for reducing the steering angle is notified. Thus, according to the steering control device 1 of the present embodiment, the occupant can easily understand movement of the steering and a change in steering angle in the own vehicle 43.

(1G) According to the steering control device 1 of the present embodiment, the steering angle is reduced to zero degrees in the process for reducing the steering angle. Thus, according to the steering control device 1 of the present embodiment, the effect described above in (1A) becomes more remarkable.

Other Embodiments

The embodiment of the steering control device 1 has been described above. However, the steering control device 1 of the present disclosure is not limited to the aforementioned embodiment. The steering control device 1 of the present disclosure can be implemented, for example, in various forms as below.

(1) According to the steering control device 1 of the aforementioned embodiment, it is determined in the process at step S9 whether the current value of the steering angle is zero degrees. However, the configuration is not limited to this. For example, another embodiment can be configured such that it is determined in the process at step S9 whether the current value of the steering angle is smaller than a predetermined threshold, and when the current value is not less than the threshold, control proceeds to step S10, and when the current value is less than the threshold, control proceeds to step S17. The threshold is a value which has been set in advance and does not need to be zero degrees. The threshold only needs to be a value indicating a determination criterion for a steering angle that can improve safety of the vehicle.

(2) The steering control device 1 of the aforementioned embodiment includes the speaker 19 and the display device 21 that the occupant can hear or see. However, the configuration is not limited to this. For example, according to another embodiment, the steering control device 1 can include a display device which can be seen from outside the own vehicle 43 and a speaker which can output a voice to the outside of the own vehicle 43. Thus, according to the steering control device 1 of another embodiment, before the process for reducing the steering angle is performed or while the process for reducing the steering angle is being performed, it is possible to notify outside the own vehicle 43 that the steering angle is changed. This allows another embodiment to improve safety of a pedestrian or the like which is present outside the own vehicle 43.

(3) According to another embodiment, it is possible to distribute functions of a single component of the aforementioned embodiment as a plurality of components or integrate functions of a plurality of components into a single component. According to another embodiment, at least part of the configuration of the aforementioned embodiment can be substituted by a publicly known configuration having a similar function. According to another embodiment, a part of the configuration of the aforementioned embodiment can be omitted. According to another embodiment, at least part of the configuration of the aforementioned embodiment can be added to or substituted by a configuration of another embodiment different from the aforementioned configuration. The steering control device 1 of the present disclosure can be implemented in any form included in a technical scope for achieving the object of the present disclosure.

(4) The functions of the steering control device 1 described above can be provided in various forms as below.

Specifically, examples include a system constituted by the steering control device 1, a program for allowing a computer to function as the steering control device 1, and a medium which stores the program.

REFERENCE SIGNS LIST

1 . . . Steering control device, 3 . . . Automatic driving control ECU, 5 . . . Steering control ECU, 7 . . . Brake ECU, 9 . . . Engine ECU, 11 . . . Sensor section, 13 . . . Cancellation instruction reception section, 15 . . . Interruption operation reception section, 17 . . . Continuation operation reception section, 19 . . . Speaker, 21 . . . Display device, 23 . . . Brake actuator, 25 . . . Engine, 27 . . . Power steering motor, 29 . . . Steering angle sensor, 31 . . . GPS, 33 . . . Surrounding area camera, 35 . . . Vehicle speed sensor, 37 . . . Acceleration sensor, 39 . . . Millimeter wave sensor, 41 . . . Seating sensor, 43 . . . Own vehicle, 44 . . . Front wheel, 45 . . . Large vehicle, 47 . . . Road

The invention claimed is:

1. A steering control device that can set and cancel an automatic driving mode, comprising:
    a steering control unit which controls a steering angle in the automatic driving mode so that a vehicle travels along an intended route;
    a cancellation instruction detection unit which detects a cancellation instruction to cancel the automatic driving mode;
    a stop detection unit which detects a stop of the vehicle; and
    a steering angle reduction unit which reduces the steering angle set by the steering control unit, if the cancellation instruction detection unit detects the cancellation instruction and the stop detection unit detects the stop of the vehicle.

2. The steering control device according to claim 1, further comprising:
    an occupant determination unit which determines whether an occupant is present in the vehicle, wherein
    when the occupant determination unit determines that the occupant is present, the steering angle reduction unit sets a reduction speed to a lower speed than when the occupant determination unit determines that no occupant is present, the reduction speed being a speed at which the steering angle is reduced.

3. The steering control device according to claim 1, further comprising:
    an interruption operation detection unit which detects a predetermined interruption operation performed by the occupant, wherein
    when the interruption operation detection unit detects the interruption operation during a process for reducing the steering angle, the steering angle reduction unit interrupts the process for reducing the steering angle.

4. The steering control device according to claim 3, further comprising:
    a continuation operation detection unit which detects a predetermined continuation operation performed by the occupant, wherein
    when the continuation operation detection unit detects the continuation operation after the process for reducing the steering angle is interrupted, the steering angle reduction unit continues the process for reducing the steering angle.

5. The steering control device according to claim 3, further comprising:
a travel direction notification unit which notifies a direction of travel of the vehicle based on the steering angle at that time point when the steering angle reduction unit interrupts the process for reducing the steering angle.

6. The steering control device according to claim 1, further comprising:
a state notification unit which notifies at least one of start and end of the process for reducing the steering angle.

7. The steering control device according to claim 1, wherein
the steering angle reduction unit causes the steering angle to be zero degrees.

8. A steering control method performed by a steering control device that can set and cancel an automatic driving mode,
the steering control method comprising:
a steering control step of controlling a steering angle in the automatic driving mode so that a vehicle travels along an intended route;
a cancellation instruction detection step of detecting a cancellation instruction to cancel the automatic driving mode;
a stop detection step of detecting a stop of the vehicle; and
a steering angle reduction step of reducing the steering angle set in the steering control step, if the cancellation instruction is detected in the cancellation instruction detection step and the stop of the vehicle is detected in the stop detection step.

* * * * *